United States Patent [19]

Iida

[11] 3,786,283

[45] Jan. 15, 1974

[54] DELAY CIRCUIT FOR PROVIDING A VARIABLE DELAY CHARACTERISTIC

[75] Inventor: Hiroshi Iida, Tokyo, Japan

[73] Assignee: Sansui Electric Co., Ltd., Tokyo, Japan

[22] Filed: Dec. 29, 1971

[21] Appl. No.: 213,653

[30] Foreign Application Priority Data

Dec. 29, 1970 Japan .............................. 45/121491

[52] U.S. Cl. .................... 307/293, 307/295, 328/55, 328/155, 333/29

[51] Int. Cl. .......................................... H03k 17/26

[58] Field of Search ........................... 307/293, 295; 328/55, 155; 333/29, 28, 80 T

[56] References Cited

UNITED STATES PATENTS

| | | | |
|---|---|---|---|
| 3,418,418 | 12/1968 | Wilder | 307/311 X |
| 3,393,327 | 7/1968 | Savage | 307/293 |
| 3,641,371 | 2/1972 | Cartwright | 307/293 |
| 2,883,534 | 4/1959 | Scarrott et al. | 328/55 |
| 3,204,130 | 8/1965 | Hickey | 307/293 X |

*Primary Examiner*—Stanley D. Miller, Jr.
*Attorney*—Richard C. Sughrue et al.

[57] ABSTRACT

A delay circuit consists of a Toulon circuit one branch of which is a reactance circuit having at least one resonance point and one anti-resonance point wherein the resonance and anti-resonance points are chosen to provide a desired delay characteristic.

5 Claims, 10 Drawing Figures

DELAY CIRCUIT FOR PROVIDING A VARIABLE DELAY CHARACTERISTIC

BACKGROUND OF THE INVENTION

This invention relates to a delay circuit and, more particularly, to a delay circuit constructed on the basis of a Toulon circuit. The designation Toulon is a known term of art which describes a known type of circuit. Basically, a Toulon circuit comprises the series connection of a reactive impedance and a resistive impedance, means for applying a voltage across the series connection, an output terminal at the junction of the reactance and the resistive impedance, and means for varying one of said impedances to achieve a phase shift of the output signal from 0° to 180° without affecting the magnitude of the output. A typical Toulon circuit is illustrated in FIG. 2 of the drawings to be described hereinafter. Toulon circuits are also illustrated and described in the following publications:

1. "Manual of Automatic Voltage Regulating Devices," first edition, published by OHM-SHA Company, Ltd., Nov. 20, 1955, particularly Section 6.5.2 and FIG. 6.11;
2. "Handbook of Electronics and Communications," first edition, published by the Institute of Electronics and Communications of Japan, Aug. 25, 1967, particularly Section 6.2 and FIG. 30; and
3. "Electronics Circuit," first edition, published by Kyoritsu Shuppan Company, Ltd., Mar. 15, 1953, particularly Section 3.2.5 and FIGS. 3.20 and 3.21.

As is well known in the art, the composite signal in a stereo-signal must be transmitted through the band width of 50 to 53 KHz, but, frequently, the second channel signal called generally "SCA" (Subsidiary Communication Authorizations) broadcast is concurrently transmitted through the band width of 67 KHz ± 8 KHz. If such stereo-broadcast is received by a conventional radio set having no special means responsive to that broadcast, a switching signal of 38 KHz and an SCA signal generate a beat signal to thereby cause difficulty in hearing the stereo-sound. Hence, a general stereo-receiver is constructed to remove such an undesired signal by means of an SCA filter prior to the switching operation. However, since this SCA filter is one kind of a low-pass filter and attenuates signals of frequencies not lower than 53 KHz, signal components of the composite signal are affected and delayed increasingly as their frequencies go up and this causes a difference in delay-time between the sub-channel of 38 KHz ± 15 KHz and the main-channel of 50 KHz~15 KHz, thereby resulting in the drawback of a decreased degree of separation.

As a means to overcome the above drawback, it has been proposed to add a correcting circuit having a delay characteristic which will correct the delay characteristic of the SCA filter to the same. Thus, it has been desired to provide delay circuits which easily give any desired delay characteristic.

Therefore, it is an object of the invention to provide a delay circuit which easily gives any desired delay time characteristic.

It is another object of the invention to provide a delay circuit constructed on the basis of a Toulon circuit and including a reactance circuit in one branch of the Toulon circuit.

SUMMARY OF THE INVENTION

According to the invention, there is provided a delay circuit which is constructed on the basis of a Toulon circuit and includes in one branch of the Toulon circuit a reactance circuit having at least one resonance point and one anti-resonance point wherein these points are selectable to provide a desired delay characteristic. The reactance circuit may be made by capacitors and reactors to have resonance and anti-resonance points in accordance with a desired delay characteristic.

DESCRIPTION OF THE PREFERRED EMBODIMENTS

Figure 1:
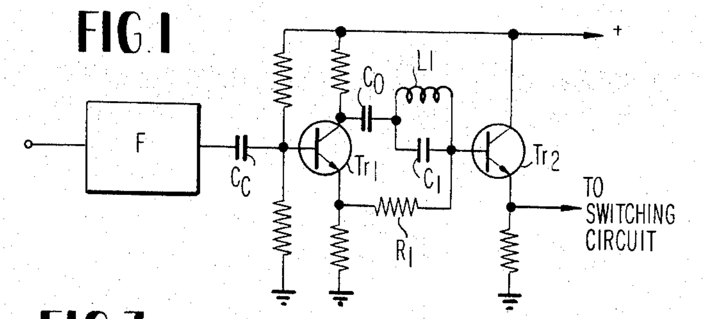
FIG. 1 is a circuit diagram of an embodiment of a delay circuit according to the invention which is used as a delay equalizing circuit in connection with an SCA filter.

Referring now to the drawing, embodiments of the invention will be described. FIG. 1 shows a delay circuit according to the invention used as a delay equalizing circuit with respect to an SCA filter. This delay equalizing circuit is constructed so that a composite signal from an SCA filter, F, is applied through a capacitor $C_c$ to a base of a transistor $Tr_1$, voltage signals appearing at a collector and an emitter of the transistor $Tr_1$ are added together through a resistor $R_1$ and a three-element reactance circuit which includes, for example, a capacitor $C_0$ and a parallel circuit of a capacitor $C_1$ and a reactor $L_1$ connected in series with the former, then, the resulting added signal is amplified in a transistor $Tr_2$ and taken out from an emitter of the transistor $Tr_2$.

Figure 2:
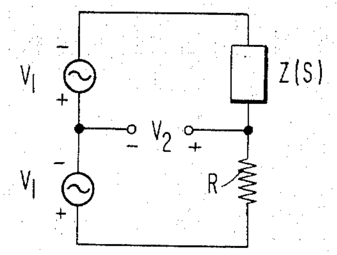
FIG. 2 is a basic equivalent circuit diagram of the delay circuit shown in FIG. 1.

The delay circuit of FIG. 1 is constructed on the basis of a typical Toulon phase shifter circuit which is shown in general form in FIG. 2. As can be seen from FIG. 2 the typical Toulon circuit comprises the series connection of a reactive impedance Z(s) and a resistive impedance R, means for applying a voltage across the series connection, and an output terminal at the junction of the reactive and resistive impedances. In FIG. 1, the reactive impedance includes capacitor $C_0$ in series with the parallel connection of capacitor $C_1$ and $L_1$. The resistive impedance includes resistor $R_1$. The reactive and resistive impedances are connected in series across the "input" which consists of the collector-emitter circuit of transistor $Tr_1$. The output is taken at the junction of the reactive and resistive impedance and applied to the transistor $Tr_2$. The transfer function of the circuit of FIG. 2 will be obtained from the following equation:

$$V_2 = [Z(s) - R/Z(s) + R]\ V_1 \quad (1)$$

where $V_1$ is an input signal, $V_2$ is an output signal, and $Z(s)$ is a reactance function. Here it is assumed that the reactance function, $Z(s)$, is represented by the following equation:

$$Z(s) = \frac{K(S^2+\omega_1^2)(S^2+\omega_3^2)(S^2+\omega_5^2)}{S(S^2+\omega_2^2)(S^2+\omega_4^2)(S^2+\omega_6^2)} \quad (2)$$

If the relation "$Z(j\omega) = jX(\omega)$" is possible, equation (1) becomes as follows:

$$V_2 = [jX(\omega) - R/jX(\omega) + R]V_1 \quad (3)$$

thus, the amplitude in equation (1) satisfies the relation $|V_2| = |V_1|$, that is, the amplitude characteristic is not responsive to frequency and resistance and does not vary.

On the other hand, the phase difference, $\phi(\omega)$, between $V_2$ and $V_1$ in equation (3) is given by the below:

$$\phi(\omega) = \pi - 2 \tan^{-}[X(\omega)/R] \quad (4)$$

Then, the delay time, $\tau$, is given by the following equation:

$$\tau = -[d\,\phi(\omega)]/d\omega$$
$$= 2\,(d/d\omega)\,(\tan^{-1}[X(\omega)]/R) \quad (5)$$

As will be apparent from equation (5), it is possible to change the delay characteristic by varying the phase.

For example, the reactance function, $Z(s)$, of the three-element reactance circuit shown in FIG. 1 is given by the following equation:

$$Z(s) = \frac{C_0+C_1}{C_0C_1}\,\frac{S^2+1/L(C_0+C_1)}{S(S^2+1/LC_1)} \quad (6)$$

that is, $$Z(j\omega) = -j(K/\omega)\,(a_o - \omega^2/b_1 - \omega^2) \quad (7)$$

where,
$K = (C_o + C_1/C_oC_1)$, $a_o = 1/[L(C_o + C_1)]$, and $b_1 = 1/(LC_1)$

Also, the following equation is obtained:

$$X(\omega) = -(K/\omega)\,(a_o - \omega^2/b_1 - \omega^2) \quad (8)$$

Figure 3:
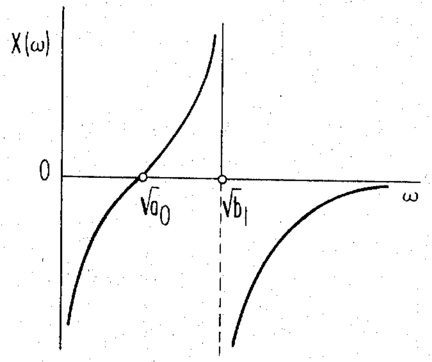
FIGS. 3 and 4 are characteristic graphs of the delay circuit shown in FIG. 1.
Figure 4:
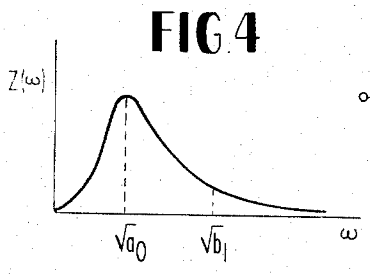

Thus, this $X(\omega)$ of equation (8) can be illustrated in a curve such as is shown in FIG. 3, and the delay time characteristic deduced from equation (5) is illustrated as shown in FIG. 4. That is, the delay time, $\tau(\omega)$, becomes a maximum at $\omega = \sqrt{a_o}$ and decreases rapidly as departing from the maximum point on either side thereof, and takes substantially a certain value above the point $\omega = \sqrt{b_1}$.

Figure 5:
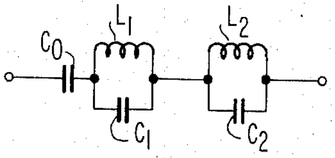
FIGS. 5 and 6 are a circuit diagram of another embodiment of a reactance circuit included in the delay circuit according to the invention and its characteristic graph, respectively.
Figure 6:
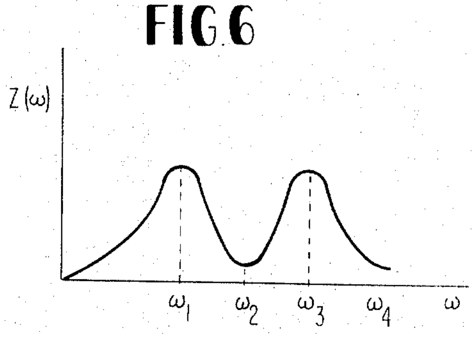

If a parallel circuit of a reactor $L_2$ and a capacitor $C_2$ is connected in series with the circuit shown in FIG. 1 to become as shown in FIG. 5 showing a modified form of the reactance circuit, Z(s) of this circuit will be obtained from equation (2) as follows:

$$Z(s) = \frac{K(S^2+\omega_1^2)(S^2+\omega_3^2)}{S(S^2+\omega_2^2)(S^2+\omega_4^2)}$$

thus, $$X(\omega) = \frac{-K}{\omega}\,\frac{(\omega_1^2-\omega^2)(\omega_3^2-\omega^2)}{(\omega_2^2-\omega^2)(\omega_4^2-\omega^2)}$$

where, $\omega_1 < \omega_2 < \omega_3 < \omega_4$. Accordingly, the delay characteristic of above Z(s) or the circuit shown in FIG. 5 becomes as shown in FIG. 6.

Figure 7:
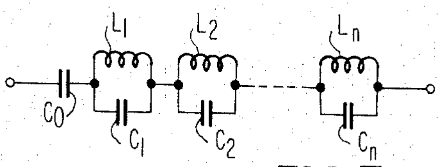
FIGS. 7 and 8 are a circuit diagram of still another embodiment of the reactance circuit and its characteristic graph, respectively.
Figure 8:
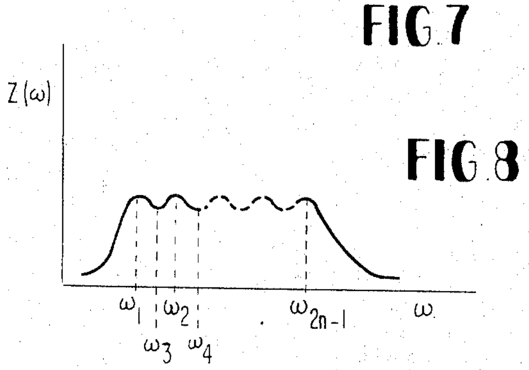

Furthermore, if Z(s) is enlarged to a circuit such as is shown in FIG. 7 having multiple cascaded parallel circuits, it has plural resonance points and anti-resonance points appearing alternately, so that by selecting suitable values of reactors and capacitors, it is possible to provide a delay circuit having a desired characteristic. One example of the delay characteristics as above is shown in FIG. 8.

As noted above, by appropriately selecting resonance and anti-resonance points of one branch, or Z(s), of the Toulon circuit, any desired delay time characteristic can be obtained.

Figure 9:
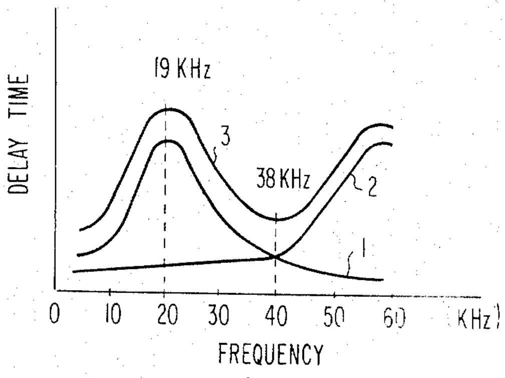
FIGS. 9 and 10 are characteristic graphs of a delay equalizing circuit for the SCA filter shown in FIG. 1.
Figure 10:
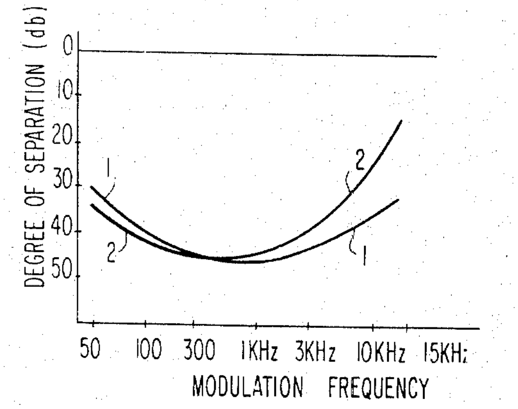

Accordingly, if the delay characteristic of the equalizing circuit shown in FIG. 1 is selected so as to correspond to curve 1 shown in FIG. 9 and $\sqrt{a_o}$ is selected to be 19 KHz, the overall delay characteristic of the SCA filter, F (having the characteristic of curve 2), and the equalizing circuit (having the characteristic of curve 1) will become such as is shown by curve 3, whereby the delay time of the sub-channel becomes equal to that of the main-channel. Hence, the degree of separation can be prevented from decreasing. Specifically, as will become clear from FIG. 10 showing the degree of separation (curve 1), the degree of separation at high frequency is remarkably improved, while curve 2 of FIG. 10 is the characteristic before correcting.

Though the series connected parallel resonance circuits were described in the embodiments, a similar characteristic can be obtained by use of parallel connected series resonance circuits and the instant delay circuit can be used for many devices other than the SCA filter as a delay equalizing circuit.

As described above, according to the invention, the reactance circuit having at least one resonance point and one anti-resonance point is included in one branch of the Toulon circuit, and the resonance and anti-resonance points can be shifted to any freqencies by selecting appropriately values of reactors and capacitors included therein; thus, the instant invention can provide the delay circuit having a desired delay characteristic.

What is claimed is:

1. A delay equalization circuit comprising a Toulon circuit of the type having a series connected reactance circuit branch and resistive circuit branch, an output terminal at the junction of said branches, and means for applying a voltage across said series connected branches, said reactance circuit branch having at least one resonance point and one anti-resonance point wherein said resonance and anti-resonance points are determinative of the frequency characteristic of said delay equalization circuit.

2. A delay equalization circuit as claimed in Claim 1 wherein said reactance circuit branch comprises a first capacitor and a parallel circuit of a second capacitor and an inductance connected in series with said first capacitor.

3. A delay equalization circuit as claimed in Claim 1 wherein said reactance circuit branch comprises a first capacitor and a plurality of cascaded parallel circuits connected in series with said first capacitor, each of said parallel circuits consisting of a capacitor and an inductance.

4. A delay equalizatIon circuit as claimed in claim 1 wherein said means for applying a voltage comprises, a transistor having an emitter, a collector and a base, said series connected branches being coupled across said emitter and collector, wherein an input signal is applied to said base and a delayed output signal appears at said output terminal.

5. A delay equalization circuit as claimed in Claim 4, wherein said reactance circuit branch comprises a first capacitor and a parallel circuit comprised of a second capacitor and an inductor connected in series wiJh said first capacitor.

* * * * *